(12) United States Patent
Olschewski et al.

(10) Patent No.: US 7,471,817 B2
(45) Date of Patent: Dec. 30, 2008

(54) METHOD FOR PERFORMING INTERACTIONS ON MICROSCOPIC SUBJECTS THAT CHANGE IN SPACE AND TIME, AND SYSTEM THEREFOR

(75) Inventors: Frank Olschewski, Heidelberg (DE); Volker Seyfried, Nussloch (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 539 days.

(21) Appl. No.: 10/809,960

(22) Filed: Mar. 26, 2004

(65) Prior Publication Data

US 2004/0197017 A1 Oct. 7, 2004

(30) Foreign Application Priority Data

Apr. 5, 2003 (DE) ................................ 103 15 592

(51) Int. Cl.
*G06K 9/00* (2006.01)
(52) U.S. Cl. ..................... 382/133; 382/212; 382/321
(58) Field of Classification Search ................ 382/103, 382/128, 133, 287, 284, 294, 140, 212, 321; 348/169
See application file for complete search history.

(56) References Cited

U.S. PATENT DOCUMENTS

| 5,611,000 A * | 3/1997 | Szeliski et al. ............... 382/294 |
| 5,655,028 A * | 8/1997 | Soll et al. .................... 382/133 |
| 5,859,700 A * | 1/1999 | Yang ........................... 356/300 |
| 6,226,418 B1 * | 5/2001 | Miller et al. ................. 382/294 |
| 6,913,877 B1 * | 7/2005 | Chaplen et al. ................ 435/4 |
| 6,944,316 B2 * | 9/2005 | Glukhovsky et al. ......... 382/107 |
| 2003/0185450 A1 * | 10/2003 | Garakani et al. ............ 382/232 |

OTHER PUBLICATIONS

Donat-P Hader, Image Analysis Methods and Applications, CRC Press, 2nd ed., pp. 409,410.*
Bernd Jahne, Spatio-Temporal Image Processing, Springer-Verlag,pp. 86.*

* cited by examiner

*Primary Examiner*—Matthew C Bella
*Assistant Examiner*—Dennis Rosario
(74) *Attorney, Agent, or Firm*—Houston Eliseeva LLP

(57) ABSTRACT

The method and the system simplify moving interactions by means of virtual reference subjects and flux-based coordinate transformations in order to generate a changeable frame of reference.

10 Claims, 5 Drawing Sheets

METHOD FOR PERFORMING INTERACTIONS ON MICROSCOPIC SUBJECTS THAT CHANGE IN SPACE AND TIME, AND SYSTEM THEREFOR

RELATED APPLICATIONS

This application claims priority of the German patent application 103 15 592.9 which is incorporated by reference herein.

FIELD OF THE INVENTION

The invention concerns a method for performing interactions on microscopic subjects that have changed in space and time. "Interaction" here means on the one hand the performance of manipulations on the microscopic subjects. "Interaction" further means the acquisition, storage, and processing of data recovered from the selected microscopic subjects.

A second aspect of the invention concerns a system for observing and manipulating microscopic subjects that have changed in space and time. The system encompasses in particular a confocal scanning microscope that guides an illuminating light beam over a subject; several detectors that identify, from the light proceeding from the subject, intensities from different spectral regions; a processing unit; a PC; an input unit; and a display.

BACKGROUND OF THE INVENTION

Numerous methods exist for performing interactions on biological subjects. It must be noted in this context, however, that these biological subjects are stationary or change little in time and space. An evaluation of data from microscopic subjects that change in time and space has not hitherto been performed satisfactorily.

SUMMARY OF THE INVENTION

The object underlying the invention is to create a method for performing interactions on microscopic subjects that change in space and time, and in that context to be able to guarantee, regardless of the motion of the microscopic subjects, a controlled interaction at the selected regions or positions within the microscopic subject.

The stated object is achieved by way of a method for performing interactions, using a microscope, on microscopic subjects that change in space and time, comprises the following steps:
  acquiring at least one image of a sample that encompasses at least one microscopic subject;
  defining by the user virtual reference subjects on a discrete grid of the acquired image or images, in order to define regions;
  automatic acquiring of a sequence of image data or volume data;
  successive identifying an optical flux based on the sequence of acquired images;
  applying the identified optical flux to the defined reference subjects; and
  performing interactions on the reference subject modified by the optical flux.

A further object of the invention is to create a system for performing interactions on microscopic subjects that change in space and time, and in that context to be able to guarantee, regardless of the motion of the microscopic subjects, a controlled interaction at the selected regions or positions within the microscopic subject.

The stated object is achieved by way of a system for interactions on microscopic subjects that change in space and time comprising:
  a confocal scanning microscope that guides an illuminating light beam over a subject;
  several detectors that identify, from the light proceeding from the subject, intensities from different spectral regions;
  a processing unit;
  a PC;
  an input unit;
  a display on which an individual image is presented to the user; the user interactively defines virtual reference subjects on the image shown on the display, using the input unit for position definition;
  a means for determining the optical flux based on the intensities from different spectral regions identified by the detectors is housed in the processing unit; and
  a means for applying the optical flux to the virtual reference subjects is present in the processing unit and the processing unit controls interactions on the basis of the changed reference subjects.

The invention has the advantage that firstly an image of a sample is generated with a microscope, the image encompassing at least one microscopic subject. On the basis of the image, at least one virtual reference subject is defined interactively by the user. This reference subject defines a discrete point set of interaction locations, continuous regions of interaction locations, or local coordinate systems that are placed in the center points of the imaged subjects. At least one region, or several positions, in the subject are determined by this step. A sequence of images is acquired with the microscope, and an optical flux is calculated from those images. This optical flux describes the motion of the grayscale values from one image to the next. The optical flux calculated from the sequence of images is applied to the set of predefined virtual reference subjects, such as the Cartesian coordinate system, region, or positions in the subject. Lastly, the interactions are performed on the virtual reference subjects modified by the optical flux, and therefore in a modified coordinate system, a modified region, or the modified positions in the microscopic subject that is changing in time and space. This ensures that the interaction is performed at the location desired by the user, despite independent motion or deformation of the microscopic subject.

The interaction is defined, in the context of this document, as the recovery of measured data from the subject, or also as the controlled manipulation of the subject at at least one position of the subject. Examples including the recovery of intensity parameters by imaging or by calculations such as mean, maximum, variance, or any elements of the intensity distribution within a region. The recovery of measured data can also be the recovery of geometrical data—for example the center point, area, periphery, or volume of a marked region, or the motion of the center point of the marked region—that change under the influence of the flux field. Further classes of measured values result from the detection of collisions of marked subjects under the influence of the flux field. These measured data are extracted in suitable form by means of the method, and are subsequently available for visualization and computer-controlled data analysis. Further examples of interactions is the controlled illumination of positions or areas within the subject with electromagnetic radiation. Manipulation of the subject may involve, for example, controlled bleaching of dyes, controlled photo activation of dyes, or cage-compound release in a specific region of the microscopic subject (e.g. a cell nucleus). Manipulation of the microscopic subject can also encompass the cutting or excision of the specific region or positions of the subject. It is particularly important in this context that the motions of and the change over time in the subject also be sensed, in order to cut or manipulate the microscopic subject at the correct and desired point. The interaction can thus encompass the recovery of all conceivable measured data and also the controlled manipulation of the subject in a selected region or at selected positions of the microscopic specimen.

The invention will be described below using the example of a confocal microscope, it being clear to one skilled in the art that this same technology can also be applied to other types of microscope. Further advantageous embodiments of the invention are evident from the dependent claims.

BRIEF DESCRIPTION OF THE DRAWINGS

The subject matter of the invention is depicted schematically in the drawings and will be described below with reference to the Figures, in which.

DETAILED DESCRIPTION OF THE PREFERRED EMBODIMENTS

Figure 1:
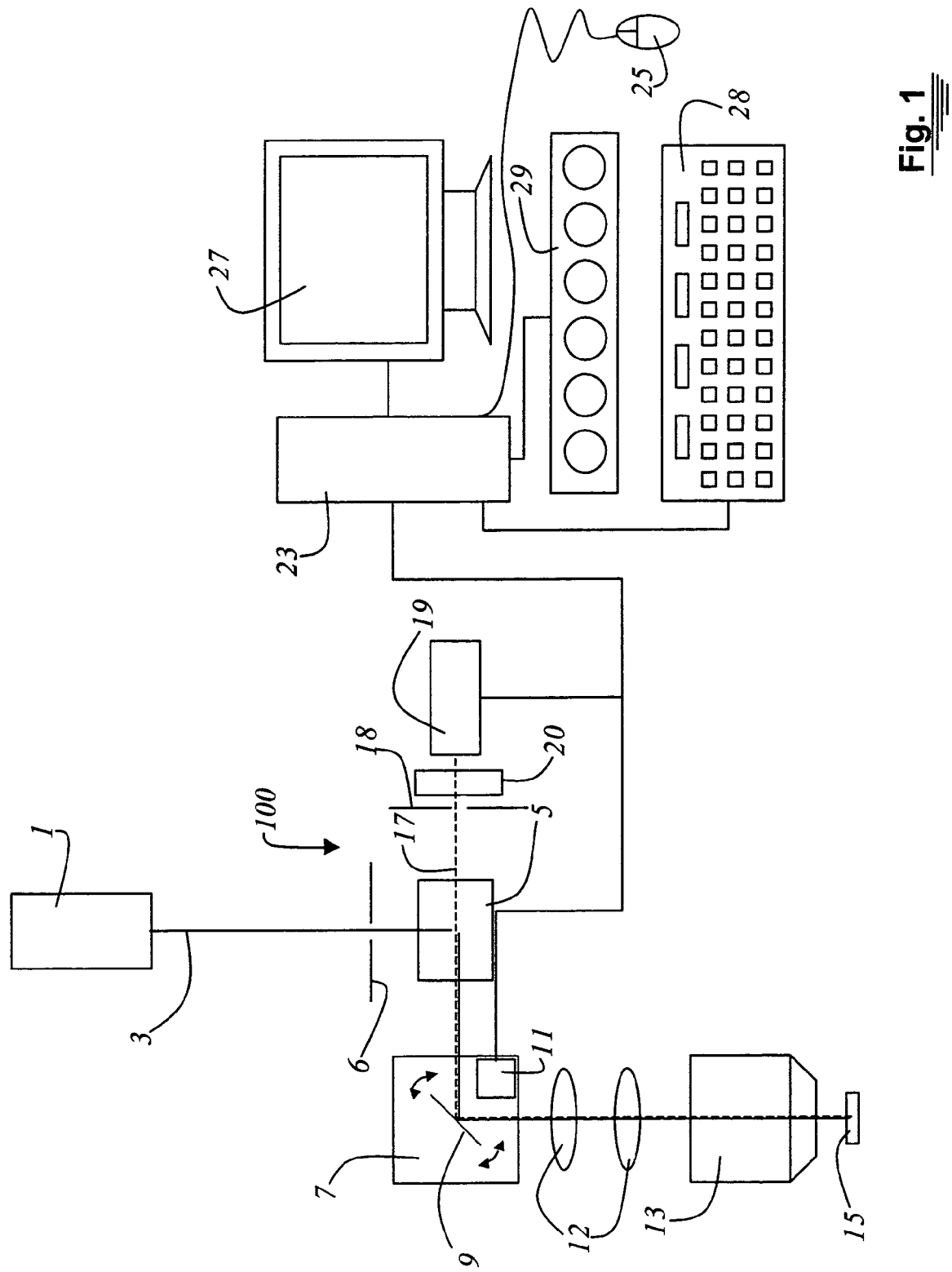
FIG. 1 schematically depicts an exemplary embodiment of a scanning microscope, an SP module being placed downstream from the detectors.

FIG. 1 schematically shows a exemplary embodiment of a confocal scanning microscope 100. Although a confocal scanning microscope 100 is depicted here, this is not to be construed as a limitation of the invention. It is also equally conceivable to implement the subject matter of the invention using a conventional microscope. Illuminating light beam 3 coming from at least one illumination system 1 is directed by a beam splitter or a suitable deflection means 5 to a scanning module 7. Before illuminating light beam 3 strikes deflection means 5, it passes through an illumination pinhole 6. Scanning module 7 encompasses a gimbal-mounted scanning mirror 9 that guides illuminating light beam 3, through a scanning optical system 12 and a microscope objective 13, over or through a sample 15. In the case of non-transparent samples 15, illuminating light beam 3 is guided over the sample surface. With biological samples 15 or transparent samples, illuminating light beam 3 can also be guided through the sample. For these purposes, non-luminous specimens are prepared, as applicable, using a suitable dye (not depicted, since it is established existing art). The dyes present in the sample are excited by illuminating light beam 3 and emit light in a region of the spectrum characteristic of them. This light proceeding from sample 15 defines a detected light beam 17. The latter travels through microscope objective 13 and scanning optical system 12, and via scanning module 7 to deflection means 5, passes through the latter, and travels through a detection pinhole 18 onto at least one detector unit 19 that is embodied, for example, as a photomultiplier. In the system with scanning microscope 100 depicted here, an SP module 20 is placed before detector 19. With SP module 20, the user can select the appropriate region for detection and optionally direct it onto corresponding detectors. It is clear to one skilled in the art that other detectors, for example diodes, diode arrays, APDs, photomultiplier arrays, CCD chips, or CMOS image sensors, can also be used. Detected light beam 17 proceeding from or defined by sample 15 is depicted in FIG. 1 as a dashed line. In detector 19, electrical detection signals are generated in proportion to the power level of the light proceeding from sample 15. Because, as already mentioned above, light of more than one wavelength is emitted from the sample, it is advisable to provide SP module 20 in front of the at least one detector unit 19. The data generated by detector 19 or the detectors are forwarded to a computer system 23. Associated with computer system 23 is at least one peripheral unit 27, which is embodied e.g. as a display. The data of sample 15, acquired by the detectors and supplied to computer system 23, are displayed graphically to the user with display 27. The graphical depiction of sample 15 encompasses at least one microscopic subject 30. Also associated with computer system 23 is an input means that comprises, for example, a keyboard 28 of an adjusting apparatus 29 for the components of the microscope system, and a mouse 25. With mouse 25 the user can, for example, select microscopic subject 30 so that appropriate manipulations can be performed on the selected subject 30. In addition to selecting the entire microscopic subject 30, the user can also select individual positions $63_0$ or pixels in the image of sample 15 so that controlled manipulations or interactions can be performed on the basis of those selected positions. The microscopic subject can also be selected by the user, without direct marking, by means of automatic image processing algorithms. These image processing algorithms are sufficiently known from the existing art.

Figure 3:
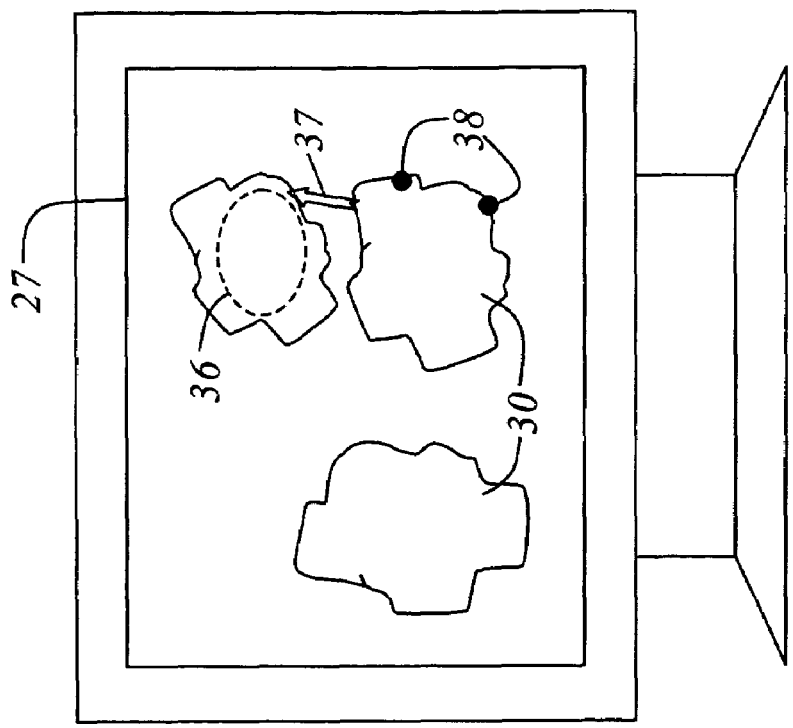
FIG. 3 shows a further embodiment of the selection of a microscopic subject.
Figure 2:
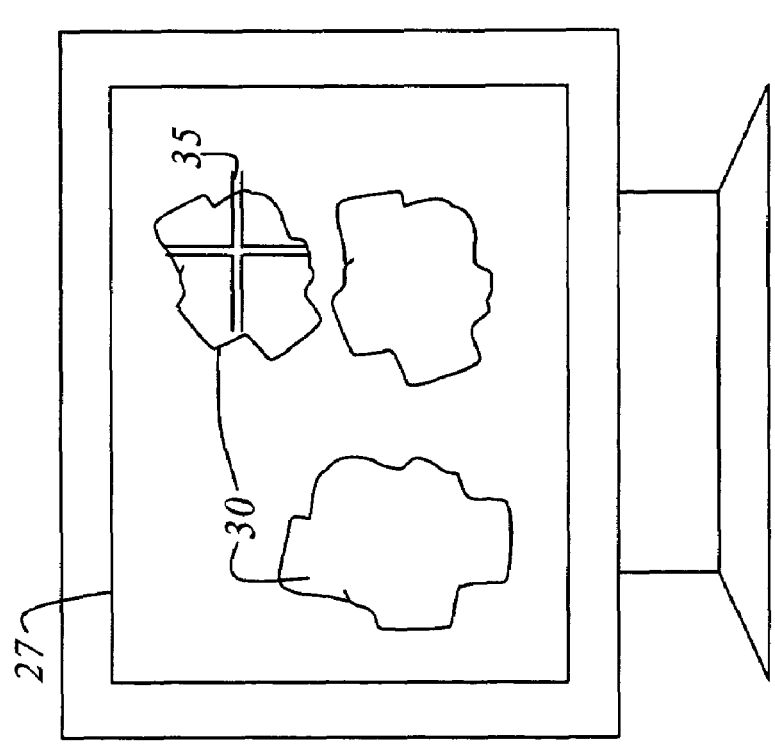
FIG. 2 shows an embodiment of the selection of a microscopic subject.

FIG. 2 depicts one embodiment for selection of a microscopic subject within sample 15. The data of sample 15 acquired by scanning microscope 100 are depicted on display 27 in visual or graphical form. The image of sample 15 encompasses several microscope subjects 30. At least one microscopic subject 30 from among microscopic subjects 30 can be selected by the user. Selection of microscopic subject 30 is accomplished, for example, by means of mouse 25. To do so the user can, for example, align a crosshairs 35 on the microscopic subject using mouse 25. That microscopic subject 30 is selected with a mouse click. On the basis of the selection, computer system 23 identifies the center point of microscopic subject 30. As depicted in FIG. 3, for example, the user can likewise define within a selected microscopic subject 30, by means of a mouse pointer 37, a virtual reference subject which stipulates a region 36 within which certain manipulations or interactions can be performed. The user can likewise define, in or on the microscopic subject, multiple positions 38 at which the selected measurements or interactions will be performed.

Figure 4:
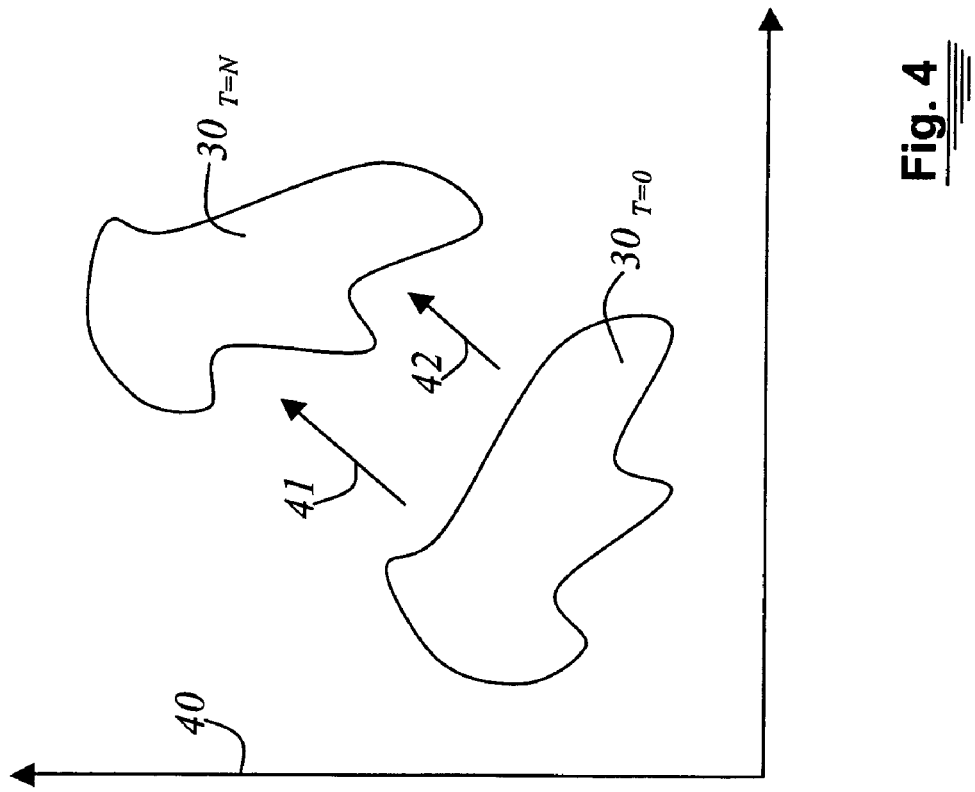
FIG. 4 graphically depicts the motion of the subject in the Cartesian coordinate system.

FIG. 4 graphically depicts the motion of a microscopic subject 30 in a static coordinate system. Static coordinate system 40 encompasses an X axis and a Y axis, both arranged perpendicular to one another. A microscopic subject 30 is plotted in coordinate system 40 at time T=0. Microscopic subject 30 is also plotted in FIG. 4 at time T=N. The transition from microscopic subject 30 at time T=0 to microscopic subject 30 at time T=N is depicted by means of a first vector 41 and a second vector 42. Second vector 42 is longer than first vector 41, indicating a motion of microscopic subject 30 that results from a translation in combination with a rotation. With this embodiment, it is difficult to define and retrieve the interaction positions and interaction surfaces that were determined and selected. The reason for this is principally that a static coordinate system is used to track the interaction positions and interaction surfaces. It is always difficult to calculate from the coordinate origin of static coordinate system 40 to the new position or location of the regions or locations within microscopic subject 30 at time T=N.

Figure 5:
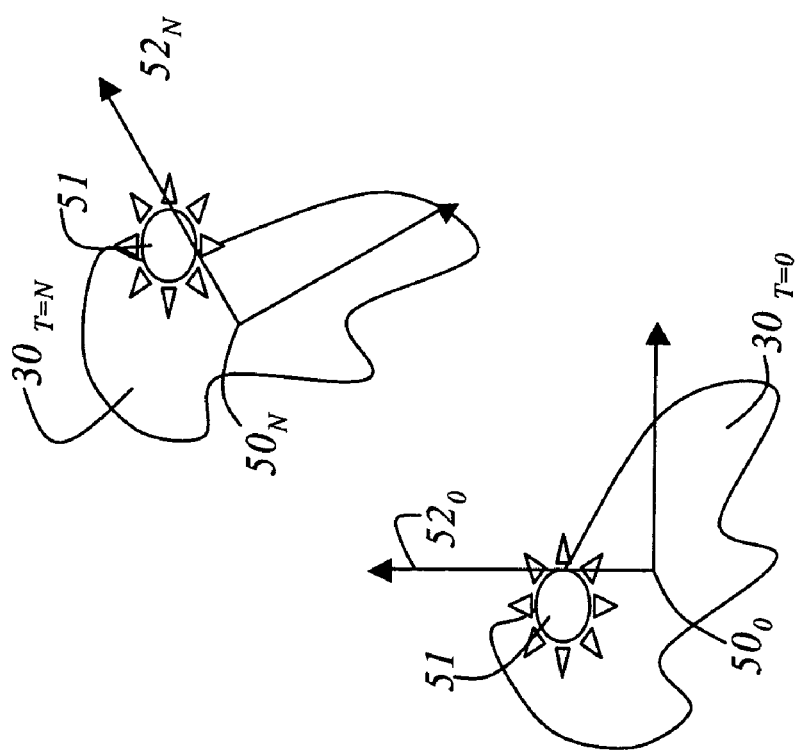
FIG. 5 graphically depicts the motion of a subject, a Cartesian coordinate system being defined at the center point of the subject and being co-moved as the subject moves.

FIG. 5 graphically depicts the motion of a microscopic subject, a coordinate system being placed, as a virtual reference subject, at the center point of the microscopic subject and following the microscopic subject as it moves. As already mentioned above, the user selects a microscopic subject 30 in the image of the sample, and computer system 23 identifies center point 50 of microscopic subject 30. FIG. 5 depicts microscopic subject 30 at time T=0. Center point $50_0$ is located inside microscopic subject 30 at time T=0. Center point $50_0$ constitutes the origin of coordinate system $52_0$ at time T=0. Microscopic subject 30 at time T=0 further encompasses a region 51 at which manipulations or interactions may need to be performed. Microscopic subject 30 at time T=N is derived, by rotation and translation, from microscopic subject 30 at time T=0. In addition, microscopic subject 30 may also have been subjected to deformations. Deformations often occur in biological subjects. There is thus also a change in the location of center point 50 at time T=N within microscopic subject 30 at time T=N. Region 51 at which manipulations or interactions are to be performed has, in the present case, migrated partially out of microscopic subject 30. The subject motions are followed by tracking the coordinate transformation, by allowing the optical flux field to act as a force on the coordinate system. This method depicted in FIG. 5 sometimes functions adequately, but fails in certain situations. Examples thereof are the deformations of the microscopic subjects already mentioned, which are common in biology.

Figure 6:
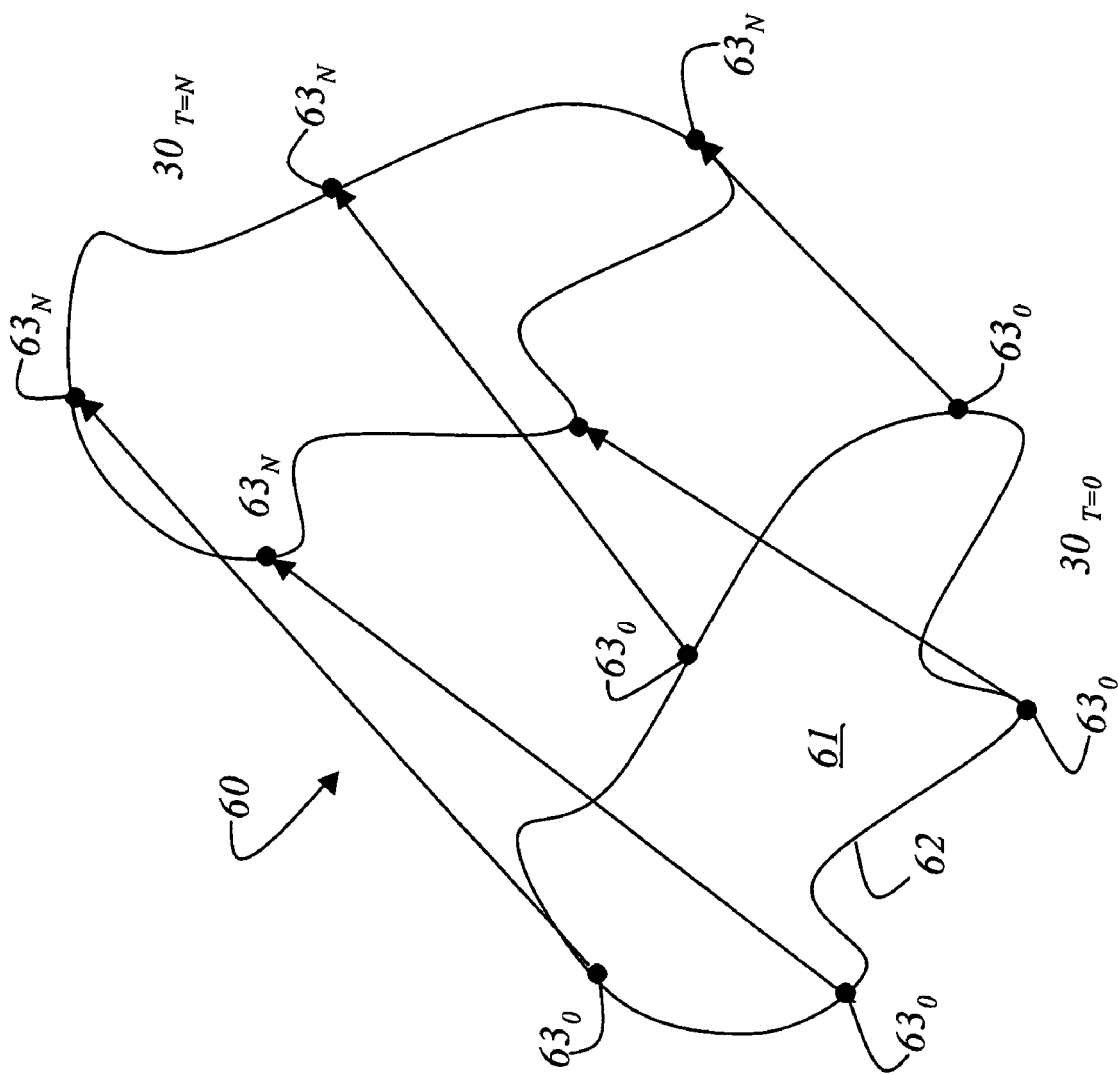
FIG. 6 schematically depicts the identification of the displacement vector field.

FIG. 6 schematically depicts the identification of a displacement vector field 60 that represents the rotation and translation between a microscopic subject 30 at time T=0 and a microscopic subject 30 at time T=N. Microscopic subject 30 is depicted by a region 61 that is enclosed by a line 62. Line 62 can also enclose the selected region, and can thus be at least a portion of microscopic subject 30. Computer system 23 then compares the defined positions $63_0$ on microscopic subject 30 at time T=0 with the locations of several positions $63_N$ on microscopic subject 30 at time T=N, by calculating a flux field that varies over time. Human eyes can perceive this by tracking individual features, as illustrated in the drawing by several positions $63_0$ along line 62. The eye cannot perceive this transformation if reference features are absent, whereas the mathematical tool supplies a solution. Displacement vector field 60 results from the association of mutually corresponding pixel positions at time T=0 and at time T=1, at the subsequent time T=2, and so on until time T=N. Displacement vector field 60 is determined by the fact that computer system 23 searches successively for correspondences between all pixel positions $63_0$ at time T=0 and pixel positions $63_N$ at time T=N. The limitation to pixels $63_0$, $63_N$ is made only for illustrative purposes; mathematically, the solution to the flux problem is performed using all the pixels. Although only two successive microscopic subjects are depicted in FIGS. 4 and 5, it is self-evident to one skilled in the art that the method of the invention can be applied to an image sequence of N images. Generalization to more than one subject is also readily possible. Based on the sequence of images or volumes, the deformation and motion are determined by solving the flux problem; these are then applied to the initially defined regions or positions, which can thus be tracked. This method does not require binarization of subjects, but instead operates on intensities and thus on a quasi-continuous model. The displacement vector field is identified, for example, by way of equations 1 through 3, which are also referred to as "optical flux" equations:

$$\lambda \nabla^2 v_1 = \left(\frac{\partial I}{\partial x}v_1 + \frac{\partial I}{\partial y}v_2 + \frac{\partial I}{\partial t}\right)\frac{\partial I}{\partial x} \qquad \text{(equation 1)}$$

$$\lambda \nabla^2 v_2 = \left(\frac{\partial I}{\partial x}v_1 + \frac{\partial I}{\partial y}v_2 + \frac{\partial I}{\partial t}\right)\frac{\partial I}{\partial x} \qquad \text{(equation 2)}$$

$$\nabla^2 = \frac{\partial^2}{\partial^2 x} + \frac{\partial^2}{\partial^2 y} \qquad \text{(equation 3)}$$

where I is the intensity. It is well known to one skilled in the art, however, that there are further flux equations which can replace these. The vector fields deriving from these equations are the modification instructions for adapting, at each time step, the locations defined by the virtual reference subjects.

The modifications or interactions are always performed on the modified coordinate system, and consequently at the modified position of microscopic subject 30. This means in practical terms that region 61 or positions 63 marked in microscopic subject 30 are subjected to the coordinate system modification defined by the displacement vector field that was identified. The modifications or interactions are applied, on the basis of the coordinate system modifications, to the virtual reference subjects, i.e. for example, to region 61 or to positions 63. The geometrical data, e.g. the center point, area, periphery, or volume of the changing microscopic subject 30, are thus, for example, ascertained as a function of time. The motion of the center point or of similar features over time can likewise be evaluated and graphically depicted. Derived geometrical data, such as velocity, acceleration, or deceleration, can be ascertained from the geometrical data. Collision, combination, and separation statistics of predefined microscopic subjects in the image of sample 15 can likewise be acquired over time, these statistics being generalized in the context of the aforementioned definition as "measurement." Intensities within a region of interest can likewise be acquired over time. This makes it possible to identify, for example, organelles or other structured subjects identifiable by biologists within a biological mass, and to measure processes in the interior of the microscopic subjects or organelles even though they are vigorously moving or wriggling. In addition, manipulations of the marked pixel regions by means of electromagnetic radiation can be performed with the method according to the present invention. When a scanning microscope is used, the manipulation by radiation at present preferably involves laser radiation for the purpose of bleaching, cutting, cage-compound release, or photoactivation, it being sufficiently clear to one skilled in the art that any additional interaction with electromagnetic radiation that arises in the future is also covered. This manipulation is applied exclusively to the region of microscopic subject 30 defined by the virtual reference subject, regardless of how the region of microscopic subject 30 changes and moves over time. When a conventional microscope or a scanning microscope is used, it is possible, for example, to mark regions or positions of a microscopic subject 30, track them over time, and cut or manipulate them at a specific point in time. The method according to the present invention ensures in this context that regardless of the motion of microscopic subject 30, the location which was selected by the user at a time T=0 is cut or manipulated.

Figure 7:
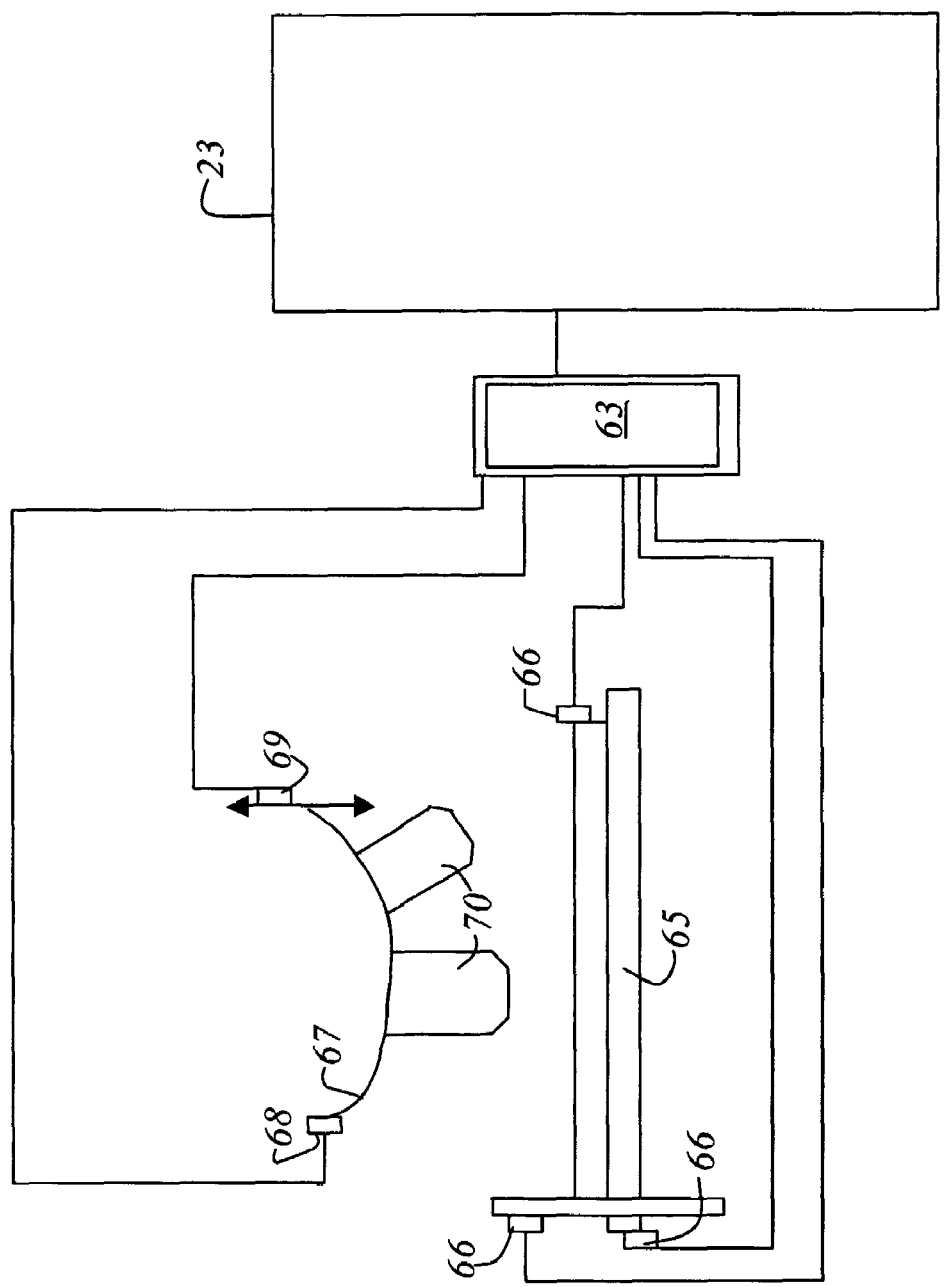
FIG. 7 schematically depicts a subregion of a further embodiment of the microscope system, various positioning elements being provided.

FIG. 7 schematically depicts a subregion of the microscope system, disclosing the connection of computer system 23 to the various positioning elements of scanning microscope 100. In a particular embodiment, calculation of the motion of microscopic subject 30 can be performed using a FPGA/DSP 63. In addition, FPGA/DSP 63 can also be employed to readjust scanning microscope 100 by way of correspondingly controllable positioning elements, if the selected microscopic subject 30, or the region in microscopic subject 30, leaves the image field defined by the microscope. FPGA/DSP 63 can also be embodied as a plug-in module in computer system 23 itself. It is likewise conceivable for a software program to implement the calculation for motion tracking and for identifying the displacement vector field. In this context, both the software and/or FPGA/DSP 63 can coact in appropriate fashion. The changes in microscopic subject 30 identified by the software module and/or by FPGA/DSP 63 are employed for correcting the optical systems of the scanning microscope as applicable. For example, if it is necessary to correct the image field of the scanning microscope because microscopic subject 30 has migrated out, actuator signals to corresponding positioning elements are thus supplied to the software program or to FPGA/DSP 63. Scanning microscope 100 is equipped with an XYZ stage 65 that is oriented adjustably in all three spatial dimensions. For each axis, a positioning motor 66 is provided with which a suitable adjustment of XYZ stage 65 can be made. The signals for the adjustment are generated, on the basis of the tracking, by the software or by FPGA/DSP 63. The software or FPGA/DSP 63 likewise generates signals to adjust an objective turret 67 of scanning microscope 100 and thus to allow a modification of the image field to be brought about. Objective turret 67 encompasses a first positioning motor 68 for rotating the objective turret, so that one of the several objectives 70 can be brought into the working position. In addition, a second positioning motor or actuator 69 (piezoelement) is provided which generates a relative motion between objective turret 67 and XYZ stage 65. Selection of a different objective 70 is suggested, for example, when a new image window needs to be selected because of the motions of microscopic subject 30 or of the selected region. Corresponding control signals are likewise supplied by the software or the FPGA/DSP 63, on the basis of the identified displacement vector field, to the galvanometers of the scanning module, so that they can follow the motion of microscopic subject 30 in appropriate fashion and thus apply the desired interaction or modification exclusively to the selected region of the microscopic subject. The number of positioning possibilities in the microscope system substantially depends principally on the particular equipment desired for the microscope system. A standard configuration of a scanning microscope 100 often has, for example, alongside an XYZ galvanometer control system for controlling the scan point, additionally an XY stage and a coarse Z actuator, resulting in two sets of actuators for each of X, Y and Z that can be used for control purposes.

The invention has been described with reference to a particular embodiment. It is self-evident, however, that changes and modifications can be made without thereby leaving the range of protection of the claims below.

What is claimed is:

1. A method for performing interactions, using a microscope, on microscopic subjects that change in space and time, comprising:
a computer comprising:
acquiring at least one image of a sample that encompasses at least one microscopic subject;
defining by the user virtual reference subjects on a discrete grid of the acquired image or images, in order to define regions;
automatic acquiring of a sequence of image data or volume data;
successive identifying an optical flux based on the sequence of acquired images;
applying the identified optical flux to the defined reference subjects; and
performing interactions on the reference subjects modified by the optical flux.

2. The method as defined in claim 1, wherein the virtual reference subjects are regions, discrete point sets, or local coordinate systems on the reference grid of the image sequence, and define interaction locations.

3. The method as defined in claim 1, wherein the interactions encompass a recovery of measured data of the subject or a controlled manipulation of the subject at the positions defined by the virtual reference subjects.

4. The method as defined in claim 3, wherein the recovery of the measured data comprises
image data;
geometrical data of the virtual reference subject, such as center point, area, periphery, or volume, or
magnitudes derived from geometrical data of the virtual reference subject, comprising at least one of velocity, acceleration, volume and area growth rates, and collision statistics of virtual reference subjects; and
determination of the intensity within the region defined by the virtual reference subject, by acquisition of an intensity distribution function and any desired parameters derived therefrom, such as mean, variance, skewness, or higher elements, as well as other parameters common in statistics such as quantile, median, or range width.

5. The method as defined in claim 3, wherein the controlled manipulation of the subject is accomplished with respect to the specific regions or positions in the subject by means of radiation, for purposes of bleaching, photo activation, cage-compound release, and cutting and excision.

6. A system for interactions on microscopic subjects that change in space and time comprising:
a confocal scanning microscope that guides an illuminating light beam over a subject;
several detectors that identify, from the light proceeding from the subject, intensities from different spectral regions;
a processing unit;
a PC;
an input unit;
a display on which an individual image is presented to the user;
a means for the user to interactively define virtual reference subjects on the image shown on the display, using the input unit for position definition;
a means for determining the optical flux based on the intensities from different spectral regions identified by the detectors is housed in the processing unit; and
a means for applying the optical flux to the virtual reference subjects is present in the processing unit and the processing unit controls interactions on the basis of the changed reference subjects.

7. The system as defined in claim 6, wherein the virtual reference subjects are regions, discrete point sets, or local coordinate systems on the reference grid of the image sequence, and define interaction locations.

8. The system as defined in claim 6, wherein the interactions accomplishes both a recovery of measured data of a subject and the controlled manipulation of the subject at the positions defined by the virtual reference subjects.

9. The system as defined in claim 8, wherein the recovery of the measured data comprises geometrical data such as center point, area, periphery, or volume, or magnitudes derived from geometrical data, comprising at least one of velocity, acceleration, volume and area growth rates, and collision statistics of virtual reference subjects; and determination of the intensity within the region defined by the virtual reference subject, by acquisition of the intensity distribution function and any desired parameters derived therefrom, such as mean, variance, skewness, or higher elements, as well as other parameters common in statistics such as quantile, median, or range width.

10. The system as defined in claim 9, wherein the controlled manipulation of the subject is accomplished with respect to the specific regions or positions in the subject, the manipulation by means of radiation, for purposes of bleaching, photoactivation, cage-compound release, and cutting and excision.

* * * * *